March 27, 1928.
F. J. HAVELICK
SIPHON
Filed April 21, 1927
1,663,840
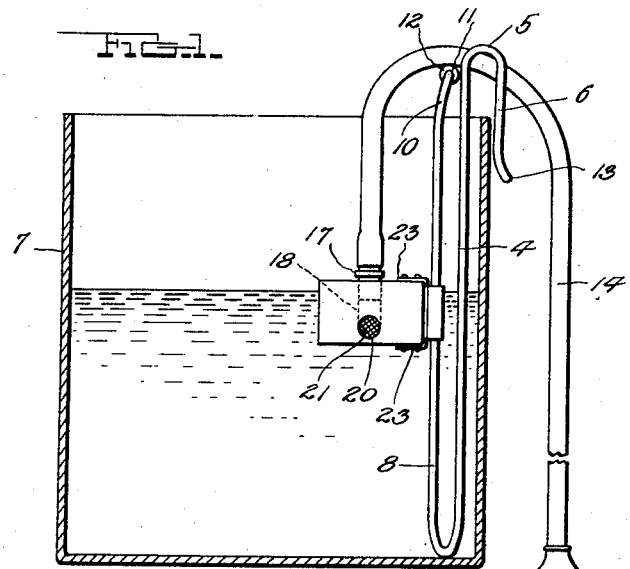
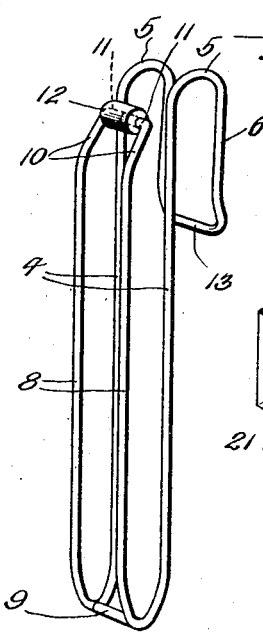
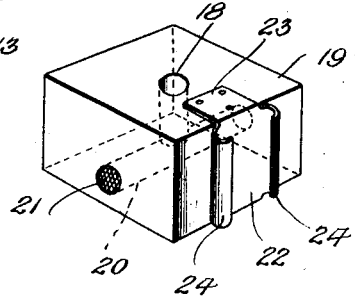
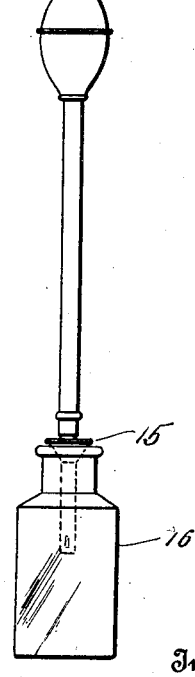
Inventor
F. J. Havelick
Witness Patented Mar. 27, 1928.

1,663,840

UNITED STATES PATENT OFFICE.

FRANK J. HAVELICK, OF BILLINGS, MONTANA, ASSIGNOR TO SARA M. HAVELICK, OF BILLINGS, MONTANA.

SIPHON.

Application filed April 21, 1927. Serial No. 185,592.

The invention aims to provide a new and generally improved form of siphon for the purpose of siphoning liquid from a receptacle, without danger of severely agitating such liquid and thus carrying off any sediment which may have accumulated upon the receptacle bottom.

In carrying out the above end, a flexible siphon tube is connected with a float which rests upon the liquid to be siphoned, and it is a further object, to provide unique means for guiding the float and permitting the tube end connected therewith, to descend with said float as the liquid is siphoned out.

Yet another object is to provide novel means for holding the float guiding means and a guiding roller for the tube, in proper relation with the receptacle from which liquid is to be siphoned.

A further object is to provide a novel form of float having screened inlets for the liquid.

A still further object is to provide the float with novel means for engagement with the above named guide.

With the foregoing in view, the invention resides in the novel subject matter hereinafter described and claimed, the description being supplemented by the accompanying drawing.

Fig. 1 is a side elevation of the invention showing its manner of use, a liquid containing receptacle being shown in section.

Fig. 2 is a perspective view of the float-guiding tracks, the tube-guiding roller, and the means for holding these parts in proper relation with the receptacle.

Fig. 3 is a perspective view of the float.

The drawing above briefly described, illustrates the preferred form of construction, and while this construction will be hereinafter specifically described, it is to be understood that within the scope of the invention as claimed, variations may be made.

The numerals 4 designate two vertical rods whose upper portions are bent laterally in one direction as at 5 and are then bent downwardly, providing hooks 6 to engage the upper end of a liquid receptacle 7. Spaced laterally in the opposite direction from the rods 4 are two additional, vertical rods 8. The lower ends of said rods 8 and the lower ends of the rods 4, are turned toward each other and joined together, these joined ends being preferably held in rigidly spaced relation by an appropriate spacer 9 which may be soldered or otherwise secured thereto. At their upper ends, the rods 8 turn toward the rods 4, as indicated at 10, the upper extremities of said rods 8 being bent laterally inward toward each other, providing stubs 11 upon which a roller 12 is rotatably mounted, said roller being downwardly spaced from the bends 5.

Preferably, the rods 4—8, the hooks 6 and the stubs 11, are all formed from different reaches of a single length of bent wire, the central portion 13 of said wire extending between and connecting the hooks 6, while the ends of said wire constitute the aforesaid stubs.

14 denotes a flexible siphon tube, preferably formed of rubber. This tube passes over the anti-friction tube guide or roller 12 and is interposed between the bends 5 so that it is effectively guided and may anti-frictionally move vertically. One end of this tube is provided with an appropriate connection 15 for engagement with a receptacle such as 16, to be filled. The other end of the tube 14 has an appropriate connection 17 with a vertical bore 18 formed in a buoyant block or float 19, said block or float being also formed with a transverse or horizontal bore 20 which communicates with the bore 18 and has its ends provided with appropriate screens 21. This float rests upon the liquid to be siphoned from the receptacle, and as the liquid level lowers, the float lowers with it, the tube 14 then moving freely over the roller 12, between the bends 5. It will thus be seen that the liquid is drawn off from the top of the body and hence there is no danger of so agitating it as to stir up and carry off any sediment which may have collected upon the receptacle bottom. Moreover, when the float reaches the limit of its downward travel the bore 20 is still spaced sufficiently from the actual bottom of the receptacle, to prevent the siphoning off of sediment.

The rods 8 constitute vertical tracks for guiding the float 19. Preferably, one vertical side of this float is provided with a sheet metal plate 22 having upper and lower laterally bent ends 23 secured to the top and bottom of said float, the vertical edges of said plate 22 being transversely curved into channel-shape to provide guides 24 which slidably engage the guides or tracks 8.

Excellent results may be obtained from the general construction shown and described, and such construction is therefore preferably followed. However, within the scope of the invention as claimed, variations may be made.

I claim:—

1. A siphon comprising a float to rest on the liquid to be siphoned, a flexible siphon tube connected with said float, an anti-friction tube guide over which to pass the tube, and means for holding said tube guide in position at the upper end of the receptacle from which the liquid is to be siphoned.

2. A siphon comprising a float to rest on the liquid to be siphoned, a flexible siphon tube connected with said float, an anti-friction tube guide over which to pass the tube, a vertical track with which said float is slidably engaged, and carrying means for said tube guide and track having a portion for engagement with the receptacle from which the liquid is to be siphoned.

3. A siphon comprising a float to rest on the liquid to be siphoned, a flexible siphon tube connected with said float, an anti-friction tube guide over which to pass the tube, a vertical track upon whose upper end said tube guide is mounted, said float being slidably engaged with said track, and receptacle-engaging means for holding said track in position within the receptacle from which the liquid is to be siphoned.

4. A siphon comprising a pair of vertical rods having their upper portions bent laterally in one direction and then downwardly to hook over the upper end of a receptacle, an additional pair of vertical rods spaced laterally in the other direction from the first named rods, the lower ends of said additional rods being secured to the lower ends of the first named rods, an anti-friction tube guide mounted between the upper ends of said additional rods and downwardly spaced from the bends at the upper ends of the first named rods, a float slidably engaged with said additional rods to rest on liquid in the receptacle, and a flexible siphon tube connected with the float, said tube passing over said tube guide and between said bends.

5. A structure as specified in claim 4; said tube guide being in the form of a roller; said rods being formed of different reaches of a single length of bent wire, the central portion of the wire extending between said hooks, the ends of the wire being inwardly bent to rotatably support said roller.

6. In a siphon, a float to rest on the liquid to be siphoned, a siphon tube connected with said float, a sheet metal plate having upper and lower ends bent laterally and secured to the float, said plate having vertical edges curved to form channel-shaped guides, and vertical trackage with which said guides are slidably engaged.

In testimony whereof I have hereunto affixed my signature.

FRANK J. HAVELICK.